US006411922B1

(12) United States Patent
Clark et al.

(10) Patent No.: US 6,411,922 B1
(45) Date of Patent: Jun. 25, 2002

(54) PROBLEM MODELING IN RESOURCE OPTIMIZATION

(75) Inventors: Douglas Patrick Clark, Tinton Falls; Donald Martin, Jr., Old Bridge, both of NJ (US)

(73) Assignee: Objective Systems Integrators, Inc., Folsom, CA (US)

( * ) Notice: Subject to any disclaimer, the term of this patent is extended or adjusted under 35 U.S.C. 154(b) by 0 days.

(21) Appl. No.: 09/224,566

(22) Filed: Dec. 30, 1998

(51) Int. Cl.$^7$ ............................................. G06F 17/50
(52) U.S. Cl. .......................... 703/2; 703/20; 709/203; 707/103
(58) Field of Search ................ 703/2, 20, 22; 709/203, 302; 707/103, 104

(56) References Cited

U.S. PATENT DOCUMENTS

| | | | | |
|---|---|---|---|---|
| 5,509,123 A | * | 4/1996 | Dobbins et al. | 395/200.15 |
| 5,561,796 A | * | 10/1996 | Fusaro | 395/500 |
| 5,615,323 A | | 3/1997 | Engel et al. | |
| 5,687,167 A | * | 11/1997 | Bertini et al. | 370/254 |
| 5,805,804 A | * | 9/1998 | Laursen et al. | 395/200.02 |
| 5,822,747 A | * | 10/1998 | Graefe et al. | 707/2 |
| 5,854,903 A | * | 12/1998 | Morrison et al. | 395/200.79 |
| 5,878,408 A | * | 3/1999 | Van Huben et al. | 707/1 |
| 6,038,212 A | * | 3/2000 | Galand et al. | 370/216 |
| 6,115,691 A | * | 9/2000 | Ulwick | 705/7 |

OTHER PUBLICATIONS

"NetExpert™ Framework Overview" copyright 1997, Objective Systems Integrators.
"Optimization Technology"; white paper—copyright 1997, ILOG, Inc.
"ILOG Optimization Suite"; white paper—copyright Apr., 1998, ILOG SA.

* cited by examiner

Primary Examiner—Kevin J. Teska
Assistant Examiner—Thai Phan
(74) Attorney, Agent, or Firm—Fulbright & Jaworski L.L.P.

(57) ABSTRACT

A system and method which examines a user information resource and transforms data objects and object relationships from the resource into optimization metrics for storage in a problem solver database. A resource optimization system comprises a problem modeler having an interface for retrieving user data objects and object relationships describing a user application from a user information resource, a solver database to which the problem modeler has an interface for storing optimization metrics derived from the user data objects and object relationships by the problem modeler, and a problem solver having an interface to the solver database for retrieving the optimization metrics for solving resource optimization problems for the user application. A method for robotically modeling a user application optimization problem comprises examining a user information resource for database objects and object relationships relevant to solving the optimization problem, transforming the database objects and object relationships into optimization metrics readable by a solver program, and storing the optimization metrics in a solver database accessible by the solver program.

39 Claims, 2 Drawing Sheets

PROBLEM MODELING IN RESOURCE OPTIMIZATION

TECHNICAL FIELD

This invention generally relates to a system and method for resource optimization, and more particularly to a system and method for problem modeling in resource optimization.

BACKGROUND

Generally, the amount of profit that a company earns is directly related to how efficiently the company can utilize its costly or limited resources. The optimal allocation of resources is therefore a critical function in many areas of business for both the service and manufacturing industries. Optimal allocation of resources can, for example, lower costs, reduce waste, shorten cycle time, improve throughput or response time, accelerate delivery time, and optimize equipment design. Some business allocation problems are simple enough to be solved with a direct solution. For many other resource allocation problems, however, the problem structure is complex or the number of possible solutions is extremely large. Optimization techniques have been developed for these situations to determine the optimal solution from a set of possible solutions.

There are many business domains in which optimization techniques provide significant improvement in resource allocation. Optimization can benefit business situations which involve, for example, costly assets, high sensitivity to tradeoffs among decision factors, or narrow margins for error. Specifically, applications for optimization include telecommunications network optimization, supply chain optimization, logistics resource allocation in airports and ports, manpower scheduling, maintenance scheduling, production planning, vehicle dispatching, and technician dispatching.

There are a variety of optimization techniques available, and the specific type used generally depends on the structure of the problem. Typically, if all variables are real, and all functions are linear, then linear programming is appropriate. If a problem includes integer variables, then integer programming may be used. Other techniques include the use of genetic algorithms to control evolution of the population of solutions, and the use of simulated annealing to control the rate movement in the solution space. The technique of domain reduction and constraint propagation is useful for problems with a wide variety of variables and constraints, such as integer, logical and choice variables, and linear and logical constraints. Each of these techniques is described more fully in "Optimization Technology White Paper," ILOG, Inc., 1997.

Generally, optimization involves two phases: first modeling the problem and then solving the problem. Modeling of the problem is typically performed by an application developer while designing software for a particular user application. Solving of the problem is then typically performed by a solver program at the request of the user application.

In the prior art, an application developer familiar with operations research algorithms generally models a problem manually. The developer typically speaks with a domain expert familiar with the particular industrial application or problem. The expert communicates the problem to be solved in descriptive terms to the developer, who then interprets the information and transforms it into a mathematical model consisting of objective and/or cost functions, and constraints, which abstractly represent the problem. These are often represented as mathematical matrices for traditional linear/integer programming algorithms. The terms "objective" and "cost," when used in reference to functions, are used interchangeably herein. The developer typically writes software code containing the mathematical model in an object oriented software language such as C++ by calling functions stored in C++ class libraries supplied with a vendor's optimization software suite.

This method of implementation effectively creates a hard-coded mathematical model of the problem for a specific application. This occurs, for example, because simplifying assumptions are generally made about the problem which are very specific to a given application. The result is then a specialized optimization model for a specific application in a specific domain, such as a specific video conferencing network scheduler system for a particular customer. The application developer inputs the information into a fixed data source, from which a user application may extract data and transform it into parameters that are transferred to the solver program. Generally, the data extracted from the data source is transformed using hard-coded functions generated in the implementation phase by the application developer. The parameters are provided to the problem solver in a very specific format so that the problem solver can process them. The developer may also write an application programming interface (API) to handle the interface between the solver program and the application program.

During operation, the user application program sends a solution request to the solver program. The solver program calculates an optimal solution for the solution request by applying an optimization technique to the solution request, subject to the parameters provided by the user application, and then returns an optimized solution result to the application program.

SUMMARY OF THE INVENTION

Prior art optimization software suites may contain a solver program which can receive a solution request from a user application via an API, interpret parameters representing the characteristics of the problem and transferred in a specific format from the user application, calculate an optimized solution, and return the optimized solution to the user application via the API. The prior art optimization software suites, however, still require that an application developer manually hard-code functions for the transformation of the data from the data source into the properly formatted parameters to be interpreted by the problem solver.

Accordingly, it is an object of the present invention to generally provide a generic problem modeler which can examine an existing user information resource and transform the relevant information from the resource into data that can be stored in a solver database which is directly accessible by a problem solver.

It is another object of the invention to provide a generic problem modeler which generally requires substantially less user skill than prior art systems and methods for creating models for resource optimization problems.

These and other objects, features and technical advantages generally are achieved by a system and method which examine a user information resource and transform data objects and object relationships from the resource into optimization metrics for storage in a problem solver database. A preferred embodiment resource optimization system in accordance with the present invention comprises a problem modeler having an interface for retrieving user data objects and object relationships describing a user application from a user information resource, a solver database to which the problem modeler has an interface for storing optimization metrics derived from the user data objects and object relationships by the problem modeler, and a problem solver having an interface to the solver database for retrieving the optimization metrics for solving resource optimization problems for the user application.

A preferred embodiment method for robotically modeling a user application optimization problem in accordance with the present invention comprises examining a user information resource for database objects and object relationships relevant to solving the optimization problem, transforming the database objects and object relationships into optimization metrics readable by a solver program, and storing the optimization metrics in a solver database accessible by the solver program. A preferred embodiment method for robotically solving a user application optimization problem additionally comprises receiving a solution request to the optimization problem from the user application, retrieving the optimization metrics from the solver database, calculating an optimized solution for the solution request subject to the optimization metrics, and sending the optimized solution to the user application.

A preferred embodiment computer program product for modeling a user application optimization problem in accordance with the present invention comprises a computer readable medium and a computer program stored on the computer-readable storage medium. The computer program comprises means for examining a user information resource for database objects and object relationships relevant to solving said optimization problem, means for transforming the database objects and the object relationships into optimization metrics readable by a solver program, and means for storing the optimization metrics in a solver database accessible by the solver program.

According to yet another preferred embodiment, the optimization metrics stored in the solver database are updated in real-time in response to changes in the data objects and the object relationships in the user information resource.

An advantage of the present invention is that it generally provides a generic problem modeler which can examine an existing user information resource and transform the relevant information from the resource into data that can be stored in a solver database which is directly accessible by a problem solver.

It is another advantage of the invention that it provides a generic problem modeler which generally requires substantially less user skill than prior art systems and methods for creating models for resource optimization problems.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
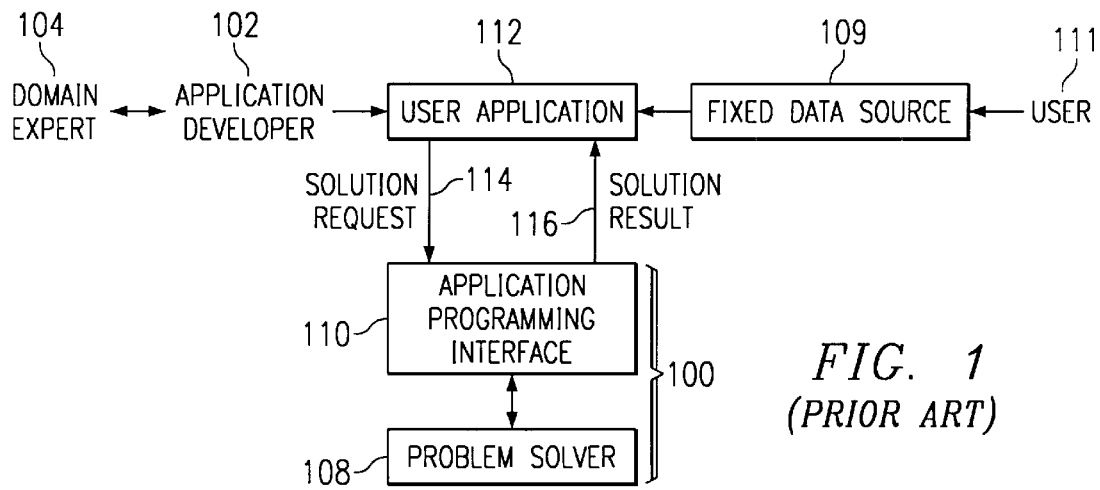
FIG. 1 is a block diagram of a prior art resource optimization system.

FIG. 1 illustrates prior art resource optimization system 100. To implement optimization system 100, application developer 102, who is familiar with operations research algorithms, models a problem manually. This is typically done by application developer 102 communicating with domain expert 104, who is familiar with the particular industrial application or problem. Expert 104 first communicates the problem to be solved in descriptive terms. Developer 102 then interprets the information and transforms it into a mathematical model which abstractly represents the problem. In creating user application 112, developer 102 writes software code containing the mathematical model in an object oriented software language such as C++ by calling functions stored in C++ class libraries typically supplied with an optimization software program suite. The translation is set by application developer 102 during the implementation phase, and is thus effectively hard-coded for a specific application. Developer 102 generally also writes an application programming interface (API) 110 to handle the interface between problem solver 108 and user application program 112.

Fixed data source 109 contains descriptions of the physical resources or inventory in the user's specific problem domain. User 111 enters the descriptions into fixed data source 109 or updates them as required. During operation, user application 112 dynamically extracts data from fixed data source 109 and uses the hard-coded functions generated by application developer 102 to transform the data into input parameters for problem solver 108. User application 112 then sends solution request 114 to problem solver 108. Problem solver 108 calculates an optimal solution for solution request 114 by applying an optimization technique to solution request 114 subject to the parameters provided by user application 112, and then returns optimized solution result 116 to user application 112.

While problem solver 108 may be a fairly generic program, resource optimization system 100, however, still requires that an application developer manually hard-code functions for the transformation of the data from fixed data source 109 into the properly formatted parameters to be interpreted by problem solver 108. In addition, creating a model of the problem generally requires both an experienced application developer and an expert in the specific user application.

Figure 2:
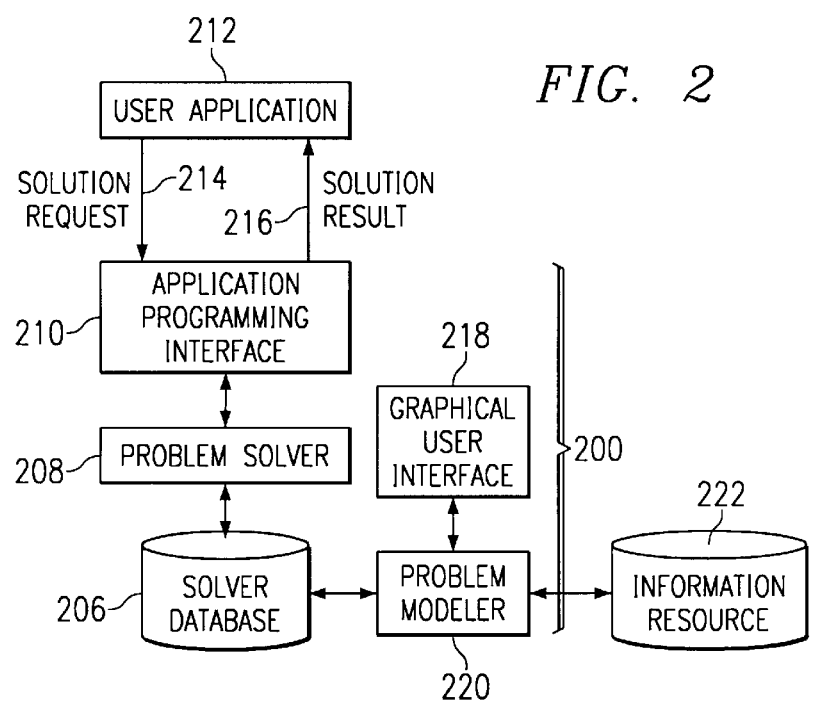
FIG. 2 is a block diagram of a problem modeler in a resource optimization system.

With reference now to FIG. 2, there is shown resource optimization system 200 in accordance with a preferred embodiment of the present invention. Problem solver 208 directly accesses the mathematical model of a problem, generally comprising matrices, objective and cost functions, and constraints, from solver database 206. Solver database 206 contains an abstract representation of the data stored in information resource 222. API 210 provides the interface between problem solver 208 and user application program 212 for translating data into the proper software protocol understood by the respective program. During operation, user application 212 sends solution request 214 to problem solver 208. Problem solver 208 calculates an optimal solution for solution request 214 by applying an optimization technique to solution request 214, subject to the problem model stored in solver database 206, and then returns optimized solution result 216 to user application 212. In contrast to the prior art, problem solver 208 has direct access to solver database 206, which contains an abstract mathematical model of the relevant data. In addition, translation functions are no longer hard-coded into the user application.

In addition to generic problem solving, resource optimization system 200 generally provides generic problem modeling via problem modeler program 220. Problem modeler 220 robotically examines the objects in an existing information or data resource 222, such as a user database or set of files, extracts out information relevant to modeling the problem, interprets the information and transforms it into the matrices, objective and cost functions, constraints, and other algorithms to be stored in solver database 206 and used by generic problem solver 208 for user application 212. As used herein, the term "robotically" generally means being capable of performing a task autonomously, without human intervention. A robotically performed task may be performed automatically and independently, without outside control. Generally, the tasks described herein for modeling and solving an optimization problem in accordance with the present invention are preferably performed robotically.

Problem modeler 220 determines the metrics and metric relationships (i.e., metrics that are functions of other metrics on the same or related objects) for each object in information resource 222, or may use defaults for those objects that it does not sufficiently understand with the information available. If needed, a developer may add external constraints or other information to help in modeling the problem. With the current metrics, problem modeler 220 populates the solution matrices in solver database 208. Problem modeler 220 also has the capability to update the metrics in solver database 206 as data in information resource 222 changes.

Graphical user interface (GUI) 218 provides an intuitive and easy to use interface to problem modeler 220, allowing a non-expert developer to configure resource optimization system 200. The user generally parses or breaks down the overall problem into smaller discrete components and describes it in high level terms. Problem modeler 220 uses information provided by the user to select and extract data from information resource 222 and transform it to create the optimization matrices, algorithms and constraints to be used by problem solver 208 for solving the user's application optimization problem. Via GUI 218, a user can tune how problem modeler 220 extracts data about the relevant objects out of information resource 222. The user can customize the type of algorithm used and how object attributes are interpreted to define the optimization problem to be solved by problem solver 208. In addition, GUI 218 allows the user to edit cost functions and constraints, as well as to define various views or methods of displaying data, and to specify relationships to use for determining physical and logical relationships between objects in information resource 222.

Information resource 222 is preferably one or more user databases, although it could be any electronic source of information from which problem modeler 220 could extract data about the specific user application. By taking advantage of an existing database of related objects with defined relationships to each other, the present invention is able to circumvent much of the highly technical analysis performed in the prior art by an application developer and a specific domain expert.

The embodiment depicted in FIG. 2 comprises two databases: information resource 222 containing raw data describing the objects and their relationships for the specific user application, and solver database 206 containing the abstract, mathematical representation of that information in a specialized format for use by problem solver 208. The separation is driven by the assumption that problem solver 208 generally needs to access its mathematical model frequently, and this may be burdensome if all information was placed in information resource 222. This is especially true if information resource 222 is a customized legacy system already deployed by a user. However, there are instances where both solver database 206 and information resource 222 could both be stored in one physical and/or logical database.

Figure 3:
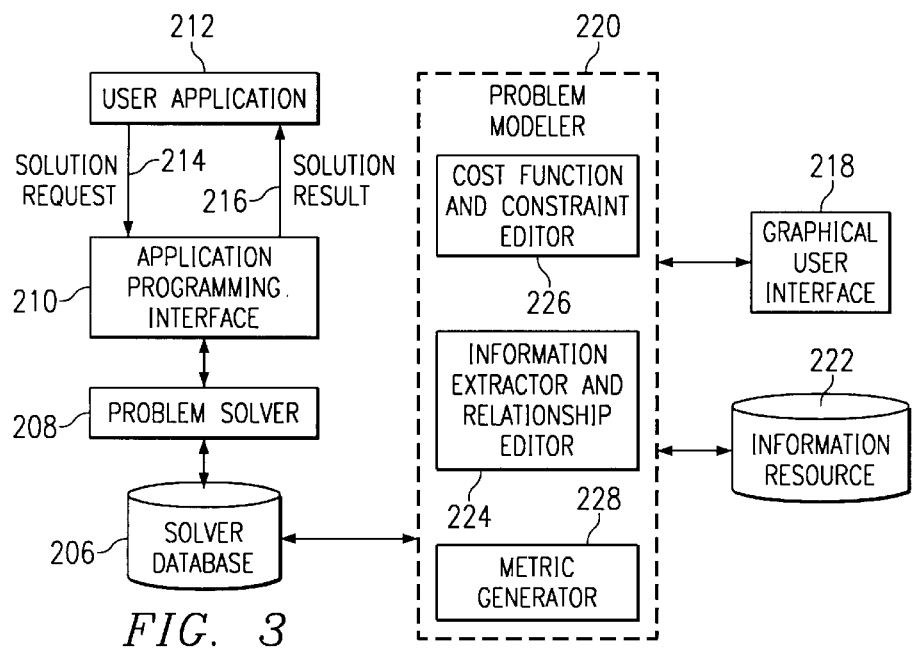
FIG. 3 is a block diagram of a problem modeler in a resource optimization system.

With reference now to FIG. 3, there is shown a more detailed block diagram which illustrates the three primary components of problem modeler 220: information extractor and relationship editor 224, cost function and constraint editor 226, and metric generator 228. During the configuration or development phase, an application developer interfaces with problem modeler 220 through GUI 218.

Information extractor and relationship editor module 224 presents an interface to the application developer for entering information about the specific relationships to be used in extracting data from information resource 222. The application developer provides information to information extractor and relationship editor 224 about the objects in information resource 222, such as the specific object data to extract from information resource 222, and what mathematical functions to apply to that data. Various views of the data stored in information resource 222 can be selected by the developer through a view editor. Each view consists of a subset of object classes from the overall set of objects in the database that have a useful association for the user, for example, all objects relevant to one layer of the Open Systems Interconnection 7-layer model.

Cost function and constraint editor module 226 presents an interface to the application developer for reviewing and editing cost functions and problem constraints. The cost functions and constraints that are generated can be represented as objects that can be referenced by problem solver 208, by the developer during editing, etc. Cost function and constraint editor 226 may contain some default constraints, such as C1 equals the sum of all metrics of the same type for all objects in the solution, or C2 equals the sum of all C1s with equal weights, etc. In addition, the application designer may use cost function and constraint editor 226 to enter fixed constraints, edit weights and construct cost functions using any of the defined metrics. The developer associates these with the predefined views from information extractor and relationship editor 224.

Metric generator module 228 extracts metrics from the database objects. The format of the metrics is flexible, and could be scalars, functions, including functions of other metrics, etc. A default is generally provided for each object, such as always assigning a value of 1 to an "OBJECT-COUNT" metric for each object. In this way, the system can provide a solution even with incomplete actual information. Such information would be available for example, for a simple "object count" default cost function. Another, more flexible approach allows the developer to define default metrics by object class in information resource 222, such as all objects in class X receiving a "COST" metric set to 5, even though the problem model does not know anything about this metric. Metric generator 228 calculates all metrics for all objects based on this information, and populates solver database 206 with matrices representing each view in a format that is understandable by problem solver 208.

Advantageously, metric generator 228 updates solver database 206 in real-time (i.e., during use of the resource optimization system by user application 212). Metric generator 228 periodically or continuously monitors information resource 222 to determine its current objects and the state of those objects, and then updates the metrics for solver database 206 so that it always contains the most current transformed view of information resource 222. In addition, metric generator 228 may retrieve update information from other management systems, which metric generator 228 can also use to update the metrics in solver database 206.

Figure 4:
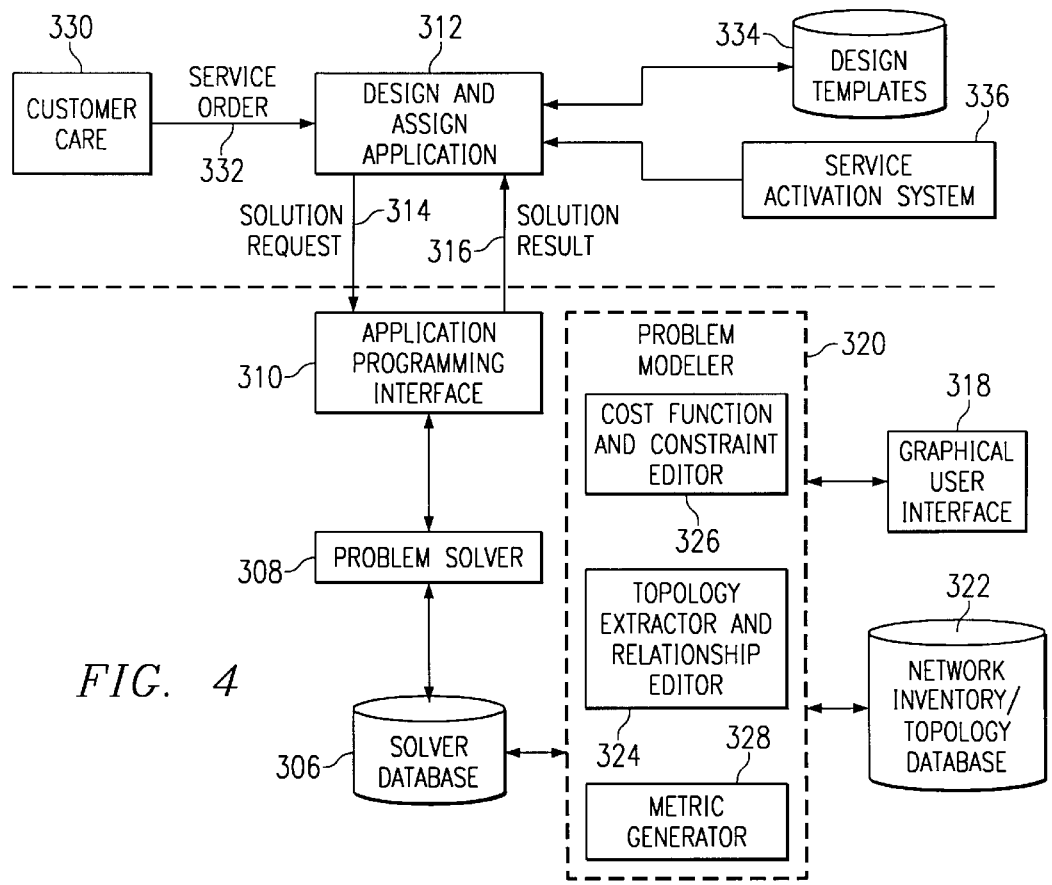
FIG. 4 is a block diagram of a resource optimization system for a network design and assign application.

With reference now to FIG. 4, there is shown a preferred embodiment of the present invention, a resource optimization system for a telecommunications network design and assign application. User design and assign application 312 comprises a network design GUI and a template builder, and interfaces to service activation system 336 and design templates database 334. Database 334 maintains local data, such as circuit design templates. A template generally refers to a user defined collection of objects and their relationships to represent an often used circuit design or component. For example, a template for a Digital Signal Level 1 (DS1) circuit spanning between two access points in a central office (CO) might include: distribution frame (DF) point to in-port on manual cross connection frame to digital cross connect system to manual cross connection frame out-port to DF point. The template identifies the needed object classes and their order. Specific resources, or object instances, then are chosen during the assignment process.

During operation, in response to a customer requesting that a circuit be designed from point A to point B, customer care 330 generates service order 332 that is received by design and assign application 312. Design and assign application 312 then sends solution request 314 to problem solver 308 via API 310. Either design and assign application 312 or API 310 converts the customer service request into the proper format for generic problem solver 308. For example, A–Z endpoints are converted into known objects, and templates are converted into constraint expressions.

The solution request object may have attributes representing required and optional parameters, plus an ID to correlate answers to requests. Parameters allow design and assign application 312 to structure the solution request and solution result to a particular problem. Application 312 may select the type of answer desired, for example whether an optimal answer is required or a feasible answer is sufficient. Application 312 may select the cost function to use, for example, application 312 may request a high survivability route optimization versus a shortest hop count route optimization over the same object set. Application 312 may select the level of the answer, or the classes of objects, or the layer view to be included in the solution. A default might be all objects in the set, or application 312 might select a higher level view.

Design and assign application 312 may also break down the overall problem into smaller problems to solve, such as finding access routes, finding interoffice routes, and finding intraoffice routes, and submit these to problem solver 308 when a sub-optimal solution is acceptable. Application 312 may select a suggested solution method, for example whether the search should be constrained, or true optimization or another technique be used. In addition, design and assign application 312 may select certain constraints. For example, this allows a request to only use equipment in the solution that has certain service features, or allows a request to choose a path that, for example, does not bump any link utilization over 75%. Finally, design and assign application may supply a timeout value to give problem solver 308 a deadline for searching for a solution.

Problem solver 308 then finds a feasible circuit path which minimizes circuit cost based on the matrices, objective and cost functions, and constraints previously loaded in solver database 306 by problem modeler 320. Problem solver 308 generates solution result 316 containing a set of objects representing the optimized circuit path. A typical answer object may include an attribute for matching the answer to the solution request ID, a set attribute for the solution path, typically containing several hundred objects or more in an ordered list, plus status attributes to convey other information, such as whether a solution exists, or that a timeout was exceeded. In response to solution result 316 from problem solver 308, design and assign application 312 takes action such as directing service activation system 336 to assign the optimized path.

Network inventory/topology database 322, which provides the data from which topology, metrics, etc. are determined by problem modeler 320, could be an existing legacy system relational database or one developed as part of the resource optimization system. Using topology information extractor and relationship editor 324, the application developer specifies which relationships in topology database 322 represent connectivity in the topology. For example, a DS1 circuit termination point may be supported by or contained in or linked up to a line card, depending on how the object model was designed. The objects and relationships are mapped into the same topology view.

The application developer also selects which layer views are needed based on the specific application. For example, a route selection process needs only CO and inter-CO link objects in an answer, but a route design process needs all the network objects in the path: cable vaults, pairs, digital cross connect system line cards, DF termination points, etc. Examples of layer views are an "Internet Protocol (IP) Layer View," which contains routers and contained line cards, and end system hosts; an "Asynchronous Transfer Mode (ATM) Layer View," which contains ATM switches and contained line cards, ATM Private Virtual Circuit (PVC) termination points, ATM cross-connection objects, Channel Service Units (CSUs) and Data Service Units (DSUs); an "Ethernet Layer View," which contain hubs, bridges, and Network Interface Cards (NICs); and a "Physical Medium View" which contains distribution frame points, cable vaults, connectors, fibers, coax, distribution cables, and twisted pairs. All of these views may be part of the same network and the same assignable inventory database. The various views may also overlap, having one or more objects in common.

During configuration or development, problem modeler 320 examines the objects and object relationships in network inventory/topology database 322, extracts out information relevant to modeling the problem, interprets the information and transforms it into the matrices, objective and cost functions, constraints, and other algorithms to be stored in solver database 306 and used by generic problem solver 308 for user application 312. Problem modeler 320 determines the metrics and metric relationships (i.e., metrics that are functions of other metrics on the same or related objects) for each object in information resource 322, or uses defaults for those objects that it does not sufficiently understand. If needed, the developer may add external constraints or other information to help in modeling the problem. Using the current metrics, problem solver 320 populates the solution matrices in solver database 306. Problem solver 320 also has the capability to update the metrics in solver database 306 as data in information resource 322 changes, in order to keep solver database 306 in synchronization with the data in information resource 322.

Topology extractor and relationship editor 324 presents an interface to the application developer for entering information about the specific relationships to be used in extracting data from topology database 322. The application developer provides information to topology extractor and relationship editor 324 about the objects in topology database 322, such as the specific object data to extract from topology database 322, and what mathematical functions to apply to that data.

Cost function and constraint editor 326 presents an interface to the application developer for reviewing and editing cost functions and problem constraints. The cost functions and constraints that are generated are objects that can be referred to by the application, during editing, etc. Cost function and constraint editor 326 may contain some default constraints, such as C1 equals the sum of all metrics of the same type for all objects in the solution, or C2 equals the sum of all C1s with equal weights, etc. In addition, the application designer may use cost function and constraint editor 326 to enter fixed constraints, edit weights and construct cost functions using any of the defined metrics. The developer associates these with the predefined views from topology extractor and relationship editor 324.

Metric generator 328 extracts metrics from the database objects. The format of the metrics is flexible, and, for example, could be scalars or functions, including functions of other metrics. A default is generally provided for each object, such as always assigning a value of 1 to an "OBJECTCOUNT" metric for each object. In this way, the system can provide a solution even with incomplete actual information. Such information would be available for example, for a simple "hop count" default cost function. Another, more flexible approach allows the developer to define default metrics by object class in topology database 322, such as all switch objects in class X receiving a "SWITCHCOST" metric set to 5, even though the problem model does not know anything about this metric. Metric generator 328 calculates all metrics for all objects based on this information, and populates solver database 306 with matrices representing each view in a format expected accessible by problem solver 308.

Advantageously, metric generator 328 updates solver database 306 in real-time (i.e., during use of the resource optimization system by user application 312). Metric generator 328 periodically or continuously monitors topology database 322 to determine its current objects and the state of those objects, and then updates the metrics for solver database 306 so that it always contains the most current transformed view of topology database 322. In addition, metric generator may retrieve update information from other systems, such as fault and performance management systems, which metric generator 328 can also use to update the metrics in solver database 306.

Of course, other types of solution requests and responses would be used as appropriate for domains other than telecommunication network design and assign. In addition to the domains discussed in the background section, the present invention has application in network planning, work force management, scheduling, such as human or machine resources, and in finding routes for fleets of trucks, cars or airplanes.

The present invention may be used in a time-based extension for some applications, such as network design and assign, wherein optimization is done in multiple time slices, instead of just on a one time basis. In addition to the current views, a projection and view are provided of the resource configuration in the future, and the resource optimizer takes the future state into account in modeling and solving optimization problems. The future view could be stored in either the solver database or the information resource, although it is preferable that it be stored in the solver database, especially for legacy system integration.

Although the present invention and its advantages have been described in detail, it should be understood that various changes, substitutions and alterations can be made herein without departing from the spirit and scope of the invention as defined by the appended claims.

What is claimed is:

1. A resource optimization system, said system comprising:
    a problem modeler having an interface for retrieving user data objects and object relationships describing a user application from a user information resource;
    a solver database, said problem modeler having an interface to said solver database for storing optimization metrics derived from said user data objects and object relationships by said problem modeler; and
    a problem solver having a direct interface to said solver database for retrieving said optimization metrics for solving resource optimization problems for said user application.

2. The resource optimization system of claim 1, wherein said user information resource is a user database.

3. The resource optimization system of claim 1, wherein said user information resource and said solver database are separate physical databases.

4. The resource optimization system of claim 1, wherein said optimization metrics comprise cost functions and constraints.

5. The resource optimization system of claim 1, wherein said problem modeler comprises:
    an information extractor and relationship editor module for receiving instruction from a user on extracting said data objects and object relationships from said user information resource;
    a cost function and constraint editor module through which said user may review and edit optimization cost functions and constraints; and
    a metric generator module for generating said metrics from said database objects and said object relationships, and storing said metrics in said solver database.

6. The resource optimization system of claim 1, wherein said optimization metrics are updated by said problem modeler in real-time.

7. The resource optimization system of claim 1 further comprising an application programming interface in communication with said problem solver for providing translation between said problem solver and said user application.

8. The resource optimization system of claim 1 further comprising a graphical user interface connected to said problem modeler for interacting with said user.

9. The resource optimization system of claim 1, wherein said user application is a telecommunications network design and assign application, and said information resource is a user network topology database.

10. A method for robotically modeling a user application optimization problem, said method comprising:
   examining a user information resource for data objects and object relationships relevant to solving said optimization problem;
   transforming said data objects and said object relationships into optimization metrics readable by a solver program; and
   storing said optimization metrics in a solver database accessible by said solver program.

11. The method of claim 10, wherein said user information resource is a user database.

12. The method of claim 10, wherein said user information resource and said solver database are separate physical databases.

13. The method of claim 10, wherein said optimization metrics comprise cost functions and constraints.

14. The method of claim 10 further comprising providing a user with a selection of views for displaying selected classes of said data objects and object relationships.

15. The method of claim 10 further comprising receiving instruction from a user on said extracting and said transforming of said data objects and said object relationships from said user information resource.

16. The method of claim 10 further comprising monitoring said data objects and said object relationships in real-time for changes to said data objects and said object relationships.

17. The method of claim 10 further comprising updating said optimization metrics stored in said solver database in real-time in response to changes in said data objects and said object relationships in said user information resource.

18. The method of claim 10, wherein said transforming of said data objects and said object relationships further comprises assigning a default metric if insufficient information is provided in said user information resource.

19. The method of claim 10, wherein said user application is a telecommunications network design and assign application, and said information resource is a user network topology database.

20. A method for robotically solving a user application optimization problem, said method comprising:
   examining a user information resource for data objects and object relationships relevant to solving said optimization problem;
   transforming said data objects and said object relationships into optimization metrics readable by a solver program;
   storing said optimization metrics in a solver database accessible by said solver program;
   receiving a solution request to said optimization problem from said user application;
   retrieving said optimization metrics from said solver database;
   calculating an optimized solution for said solution request subject to said optimization metrics; and
   sending said optimized solution to said user application.

21. The method of claim 20, wherein said user information resource is a user database.

22. The method of claim 20, wherein said user information resource and said solver database are separate physical databases.

23. The method of claim 20, wherein said optimization metrics comprise cost functions and constraints.

24. The method of claim 20 further comprising providing a user with a selection of views for displaying selected classes of said data objects and object relationships.

25. The method of claim 20 wherein said examining step comprises extracting said data objects and said object relationships from said user information resource, the method further comprising receiving instruction from a user on said extracting and said transforming of said data objects and said object relationships from said user information resource.

26. The method of claim 20 further comprising monitoring said data objects and said object relationships in real-time for changes to said data objects and said object relationships.

27. The method of claim 20 further comprising updating said optimization metrics stored in said solver database in real-time in response to changes in said data objects and said object relationships in said user information resource.

28. The method of claim 20, wherein said transforming of said data objects and said object relationships further comprises assigning a default metric if insufficient information is provided in said user information resource.

29. The method of claim 20, wherein said user application is a telecommunications network design and assign application, and said information resource is a user network topology database.

30. A computer program product including computer readable logic recorded thereon for modeling a user application optimization problem, the computer program product comprising:
   a computer readable medium; and
   a computer program stored on the computer-readable storage medium, the computer program comprising
      computer-executable means for examining a user information resource for data objects and object relationships relevant to solving said optimization problem,
      computer-executable means for transforming said data objects and said object relationships into optimization metrics readable by a solver program, and
      computer-executable means for storing said optimization metrics in a solver database accessible by said solver program.

31. The computer program product of claim 30, wherein said user information resource is a user database.

32. The computer program product of claim 30, wherein said user information resource and said solver database are separate physical databases.

33. The computer program product of claim 30, wherein said optimization metrics comprise cost functions and constraints.

34. The computer program product of claim 30 further comprising means for providing a user with a selection of views for displaying selected classes of said data objects and object relationships.

35. The computer program product of claim 30 wherein said means for examining is operable for extracting said data objects and said object relationships from said user information resource, the computer program product further comprising means for receiving instruction from a user on said extracting and said transforming of said data objects and said object relationships from said user information resource.

36. The computer program product of claim 30 further comprising means for monitoring said data objects and said object relationships in real-time for changes to said data objects and said object relationships.

37. The computer program product of claim 30 further comprising means for updating said optimization metrics stored in said solver database in real-time in response to changes in said data objects and said object relationships in said user information resource.

38. The computer program product of claim 30, wherein said means for transforming said data objects and said object relationships further comprises assigning a default metric if insufficient information is provided in said user information resource.

39. The computer program product of claim 30, wherein said user application is a telecommunications network design and assign application, and said information resource is a user network topology database.

\* \* \* \* \*